(12) United States Patent
Lin

(10) Patent No.: US 7,511,386 B2
(45) Date of Patent: Mar. 31, 2009

(54) AIR-BLOWER TIDAL POWER GENERATION DEVICE

(76) Inventor: Ming-Hung Lin, 3F, No. 2, Lane 429, Fu-Chin Street, Taipei City (TW)

( * ) Notice: Subject to any disclaimer, the term of this patent is extended or adjusted under 35 U.S.C. 154(b) by 201 days.

(21) Appl. No.: 11/706,415

(22) Filed: Feb. 15, 2007

(65) Prior Publication Data

US 2008/0197632 A1 Aug. 21, 2008

(51) Int. Cl.
*F03B 13/12* (2006.01)
(52) U.S. Cl. .......................................... 290/53; 290/42
(58) Field of Classification Search .................. 290/42, 290/43, 44, 52, 53, 54, 55; 417/330, 331
See application file for complete search history.

(56) References Cited

U.S. PATENT DOCUMENTS

| | | | | |
|---|---|---|---|---|
| 1,523,031 A | * | 1/1925 | Mitchell, Jr. ................. | 417/333 |
| 3,668,412 A | * | 6/1972 | Vrana et al. .................. | 290/53 |
| 3,746,875 A | * | 7/1973 | Donatelli ..................... | 290/42 |
| 3,959,663 A | * | 5/1976 | Rusby ......................... | 290/53 |
| 4,544,849 A | * | 10/1985 | Choi ........................... | 290/53 |
| 5,374,850 A | * | 12/1994 | Cowen ......................... | 290/53 |
| 5,872,406 A | * | 2/1999 | Ullman et al. ................ | 290/53 |
| 5,929,531 A | * | 7/1999 | Lagno .......................... | 290/53 |
| 6,717,284 B2 | | 4/2004 | Lin .............................. | 290/53 |
| 6,800,954 B1 | * | 10/2004 | Meano ......................... | 290/53 |
| 6,863,806 B2 | * | 3/2005 | Stark et al. ............. | 210/170.05 |
| 7,078,827 B2 | * | 7/2006 | Brewington .................. | 290/53 |
| 7,199,483 B2 | * | 4/2007 | Lomerson et al. ............. | 290/53 |

* cited by examiner

*Primary Examiner*—Nicholas Ponomarenko
(74) *Attorney, Agent, or Firm*—Apex Juris, pllc; Tracy M Heims

(57) ABSTRACT

An air-blower tidal power generation device includes a rack, an air-blower mechanism, and a power generation mechanism. The air-blower mechanism includes a pumping device, a buoy, and an air conduit. The pumping device includes a cylinder and a stationary barrel movably coupled together. The power generation mechanism includes a constant-pressure and pressure-regulation device and a power generator having an air-driven turbine. Thus, tides move the buoy up and down to drive the pumping device for cyclically drawing and pumping air, and the air is preserved in the constant-pressure and pressure-regulation device to provide a constant pressure for subsequent and stable supply of airflow to the turbine for driving the power generator to generate power.

18 Claims, 6 Drawing Sheets

AIR-BLOWER TIDAL POWER GENERATION DEVICE

FIELD OF THE INVENTION

The present invention relates to an air-blower tidal power generation device, and in particular to a power generation system that utilizes tides to move a buoy of an air-blower mechanism to drive a pumping device for drawing and pumping air into a constant-pressure and pressure-regulation device from which airflow is released under constant pressure to a windmill for rotating a power generator for generation of power and that is suitable for power generation device or similar devices operable at different sea areas to extract tidal energy and can be modularized for continuously extracting energy of tides with a simple construction.

BACKGROUND OF THE INVENTION

Due to increasing demand of fossil energy, the price of oil is constantly increased. Thus, the advanced countries, such as Japan and European countries, devote a great amount of effort to develop power generation with waves and tides, which is often realized by providing a tidal power generator that is operated by the up and down movement tides to generate electrical power thereby converting the tidal energy into electrical energy. It is estimated that the world's power consumption can be satisfied by five times if 0.1% tidal energy of the world is converted into electrical energy. The storage of tidal energy is amazingly large.

Tidal power generation has been developed for hundreds of years, but no technical breakthrough has been done. A known tidal power generation device is disclosed in U.S. Pat. No. 6,717,284 B2, in the name of the present inventor, comprising a rack, an air-blower mechanism disposed at a predetermined position of the rack, the air-blower mechanism comprising an extendible cylinder, a buoy mounted to an end of the extendible cylinder and a tube mounted to another end of the extendible cylinder, the bottom of the buoy being positioned on the sea surface; a power generation mechanism comprising an air canister and a power generator having a pneumatically operated motor, the air canister being coupled to the tube, whereby the tides drive the air-blower mechanism to directly extract energy from the up and down movement of the tides for providing compressed air into the air canister from which airflow is released to drive the pneumatically operated motor of the power generator to thereby realize an air-blower tidal power generation device. The device utilizes the up and down movement of the tides, which causes a substantial difference in the height of the sea surface, to continuously drive the air-blower mechanism whereby compressed air can be obtained in all situations of large/small tides and high/low tides and stored in the air canister for subsequent supply to the pneumatically operated motor for driving the power generator. In this way, large construction and complicated mechanism can be omitted and power generation can be realized with a simple structure of the air-blower type tidal power generation device. Costs of installation and operation and time and effort required for installing the device are both reduced, which also result in easy maintenance.

The conventional air-blower type tidal power generation device, although effective in simplifying the structure and reducing costs for convenient generation of electrical power, suffers a disadvantage of instable supply of airflow of substantially fixed pressure. This is due to the fact that the air compressed and filled into the canister by the air-blower mechanism is continuously accumulated inside the canister and the internal pressure of the canister is increased with air filled into the canister. Thus, it is in general impossible to maintain constant pressure. Also, when air starts to discharge from the canister, the internal pressure of the canister is lowered. Thus, stable supply of constant pressure airflow is in general impossible.

Thus, the present invention is aimed to provide an air-blower tidal power generation device to overcome the drawbacks of the conventional devices.

SUMMARY OF THE INVENTION

An objective of the present invention is to provide an air-blower tidal power generation device, which employs tides to move a buoy of an air-blower mechanism for driving a pumping device to draw and pump air into a constant-pressure and pressure-regulation device, which stores and maintains a constant pressure of the air for subsequent and stable supply of airflow under constant pressure to an air-driven turbine for driving a power generator to generate power, wherein the pumping device comprises a cylinder and a stationary barrel that are coupled in a relatively movable manner and an airtight and stable engagement is formed between the cylinder and the barrel so that an air-blower tidal power generation device can be realized.

Another objective of the present invention is to provide an air-blower tidal power generation device comprising a gravity-controlled constant-pressure and pressure-regulation device for stable supply of airflow under constant pressure from the constant-pressure and pressure-regulation device to an air-driven turbine for driving a power generator to generate electrical power.

A further objective of the present invention is to provide an air-blower tidal power generation device comprising a pumping device having a cylinder that is composed of a metal layer, an epoxy resin layer, and a plastic sheet layer to suit the requirements of light weight, wear resistance, pressure resistance, and low friction coefficient so as to improve durability thereof and to provide an efficient conversion of energy.

To realize the above objectives, in accordance with the present invention, there is provided an air-blower tidal power generation device comprising a rack, an air-blower mechanism, and a power generation mechanism. The air-blower mechanism comprises a pumping device, a buoy, an air conduit. The pumping device comprises a cylinder and a stationary barrel movably coupled together. The cylinder comprises a metal layer, an epoxy layer, and a plastic sheet layer. The metal layer serves an inner lining and has an outer circumference surrounded by the epoxy resin layer and circumferentially reinforced by retention frames. The epoxy resin layer has an outer circumference surrounded by the plastic sheet layer. The metal layer of the cylinder has an inside surface movably fit over and engaging the stationary barrel. The cylinder that is located at an end of the pumping device is mounted to the buoy and the stationary barrel located at an opposite end of the pumping device is connected to and in fluid communication with the air conduit. The air conduit is connected to an extension tube. The air conduit has an end forming an opening in which a check valve is mounted. Another check valve is arranged inside the extension tube. The rack serves to carry and support the air-blower mechanism therein. The power generation mechanism comprises a constant-pressure and pressure-regulation device and a power generator having an air-driven turbine. The constant-pressure and pressure-regulation device is connected to and in fluid communication with the extension tube. Thus, tides move the buoy up and down to drive the pumping device for cyclically drawing and pumping air, and the air is preserved in the constant-pressure and pressure-regulation device to provide a constant pressure for subsequent and stable supply of airflow to the turbine for driving the power generator to generate power.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
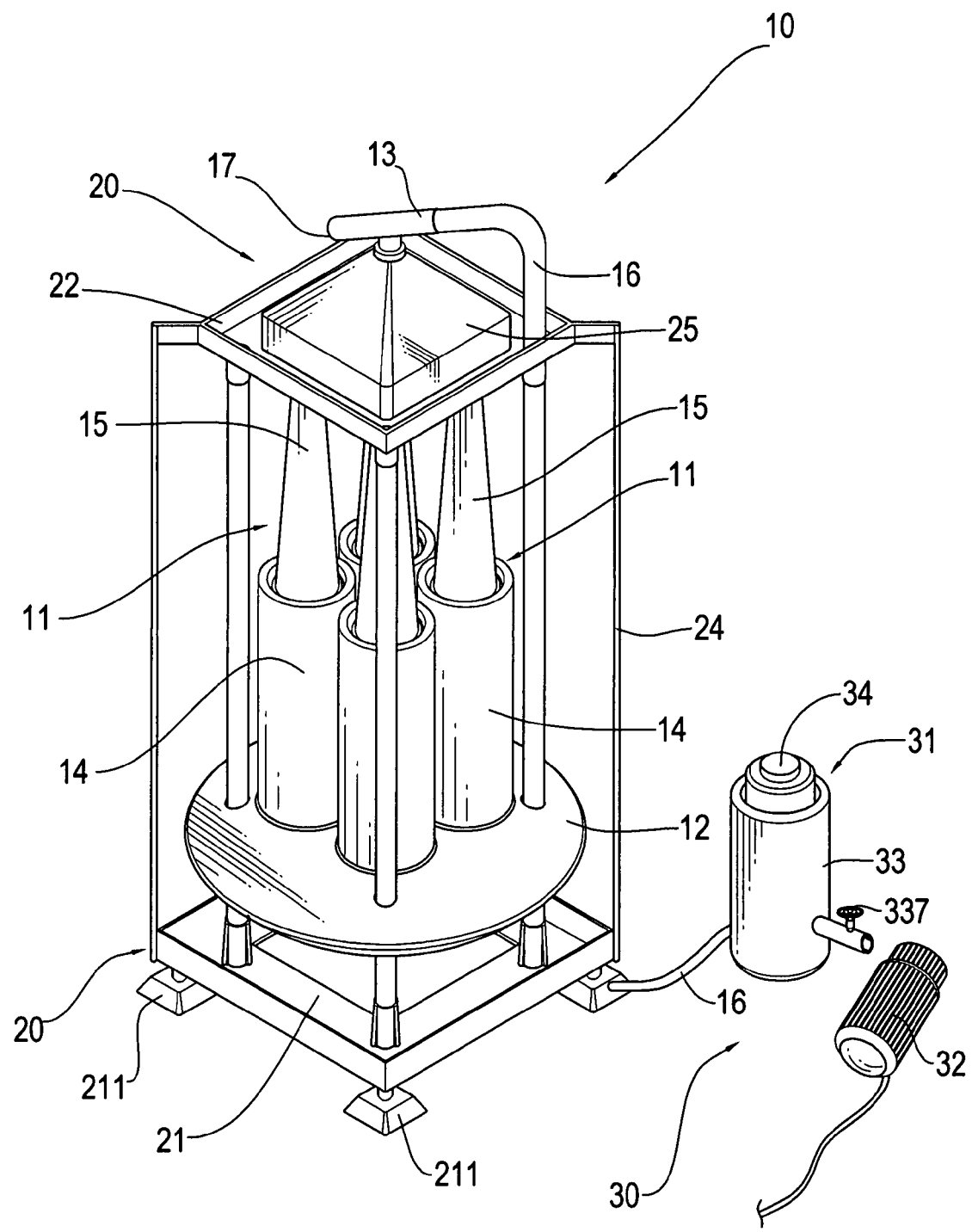
FIG. 1 is a perspective view of an air-blower tidal power generation device constructed in accordance with the present invention.
Figure 2:
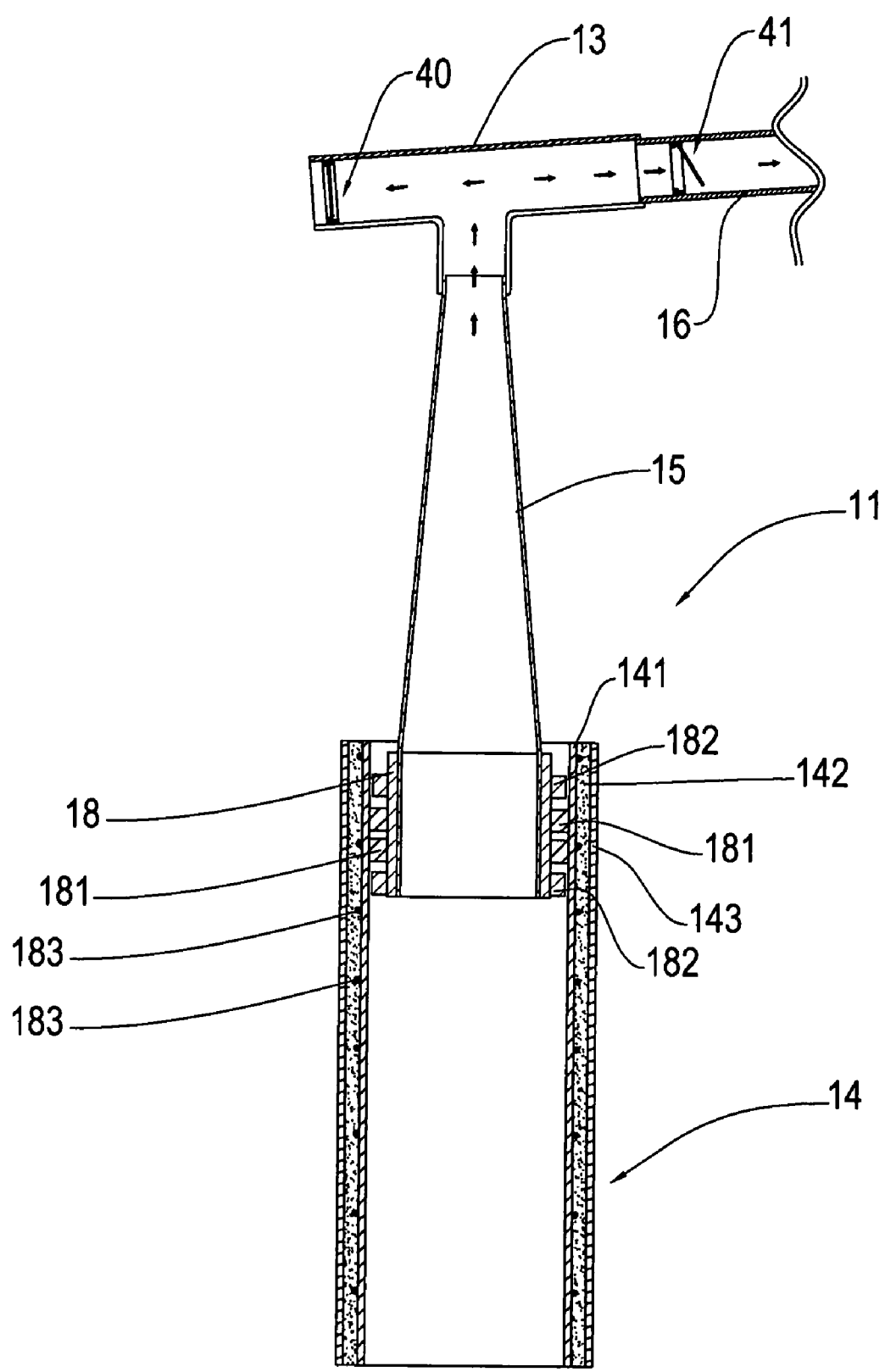
FIG. 2 is a cross-sectional view of an air-blower mechanism of the air-blower tidal power generation device of the present invention.
Figure 3:
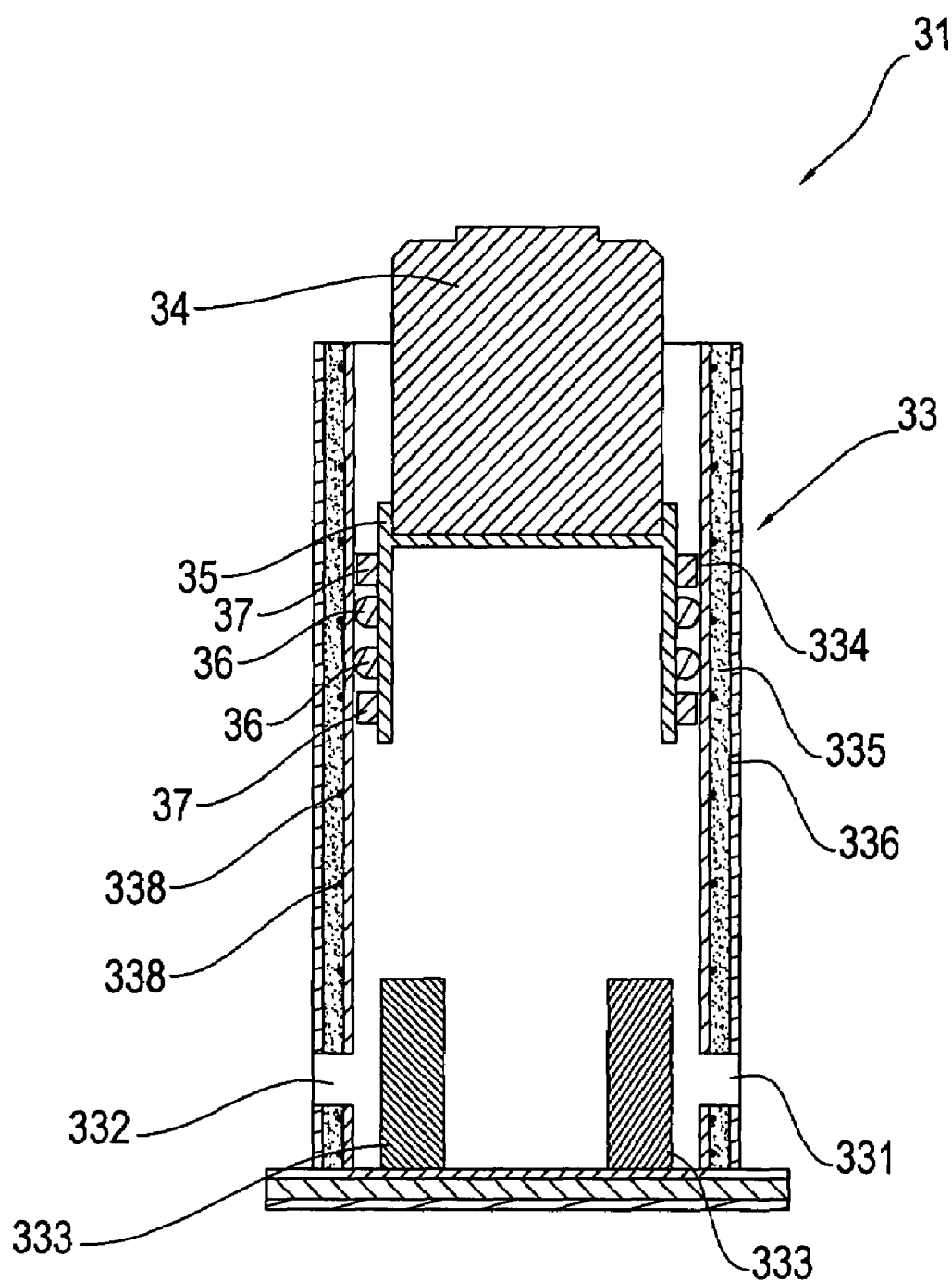
FIG. 3 is a cross-sectional view of a constant-pressure and pressure-regulation device of the air-blower tidal power generation device of the present invention.
Figure 4:
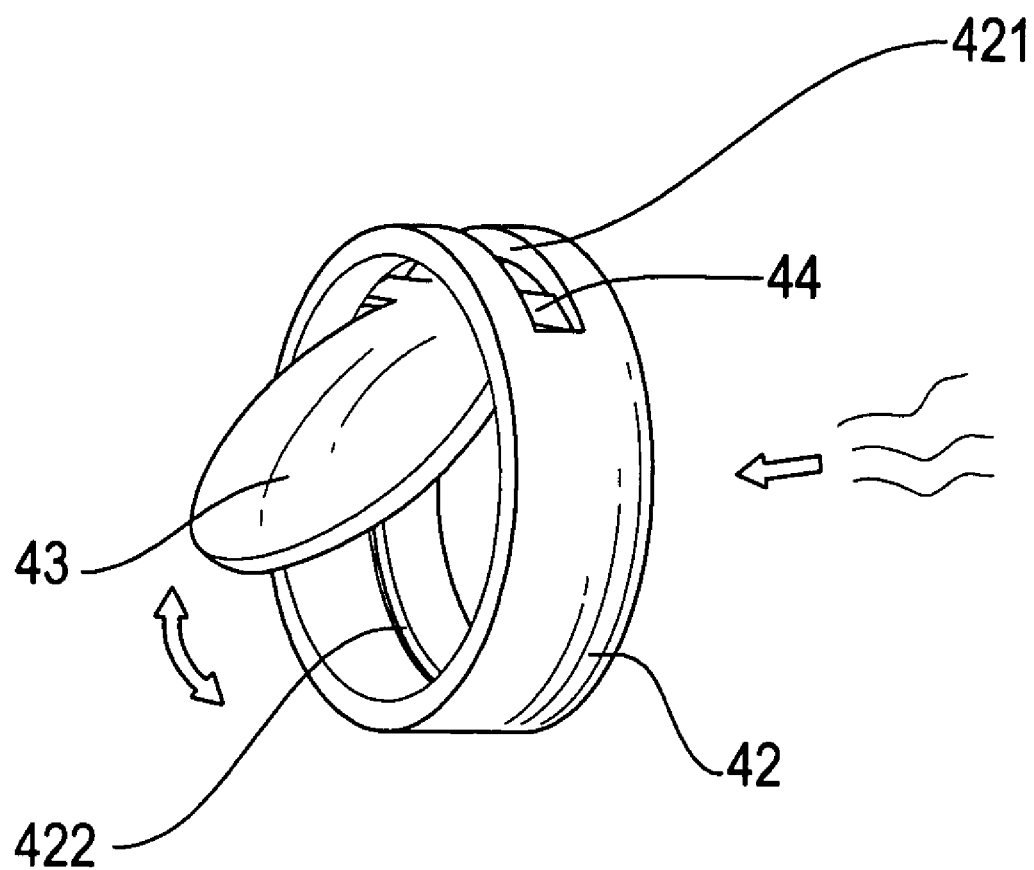
FIG. 4 is a perspective view of a check valve of the air-blower tidal power generation device of the present invention.

With reference to the drawings and in particular to FIGS. 1-4, an air-blower tidal power generation device constructed in accordance with the present invention is shown. The air-blower tidal power generation device comprises an air-blower mechanism 10, which comprises extendible/retractable pumping devices 11, a buoy 12, and an air conduit 13. The extendible/retractable pumping device 11 comprises a cylinder 14 and a stationary barrel 15 movably fit in the cylinder 14. The cylinder 14, which is in contact with gas, is subject to the requirements of light weight, pressure resistance, wear resistance, and low friction coefficient. Thus, the cylinder 14 is comprised of a metal layer 141, an epoxy resin layer 142, and a plastic sheet layer 143. The metal layer 141 serves as an inner lining and is made of a metal plate that is smooth, wear-resistant, and corrosion-resistant against sea water. Stainless steel is taken as an example in the illustration of the present embodiment. The metal layer 141 has an outer circumference around which the epoxy resin layer 142 wraps and a plurality of retention frames 183 are arranged to surround the outer circumference of the metal layer 141 to maintain the shape of the metal layer 141 of the cylinder 14. The epoxy resin layer 142 has an outer circumference around which the plastic sheet layer 143, of which an example is a thin sheet of polycarbonate (PC) wraps. The arrangement of the retention frames 183 around the outer circumference of the metal layer 141 and filling of the epoxy resin between the metal layer 141 and the plastic sheet layer 143 to form a sandwich structure realize the requirements of light weight, pressure resistance, wear resistance, and low friction coefficient. The metal layer 141 of the cylinder 14 has an inside surface fit over and engaging the stationary barrel 15 in a movable manner. A seal head 18 is provided around an outer circumference of the stationary barrel 15 at the portion of the stationary barrel 15 that is in movable engagement with the inside surface of the metal layer 141 of the cylinder 14. The seal head 18 is made of aluminum casting and is provided with sealing rings 181 to eliminate gas leakage. On upper and lower sides of the sealing rings 181, guide projections 182 that are wear resistant are provided on the seal head 18 to ensure stable up-and-down movement of the cylinder 14 with respect to the stationary barrel 15. The cylinder 14 that is located at one end of the pumping device 11 is fixed to the buoy 12 and the stationary barrel 15 that is located at an opposite end of the pumping device 11 is in fluid communication with the air conduit 13. The air conduit 13 is connected to an extension tube 16. One end of the air conduit 13 forms an opening 17 and a check valve 40 is mounted to inside surface of the air conduit 13 in proximity to the opening 17. Another check valve 41 is arranged inside the extension tube 16. The check valves 40, 41 are composed of a ring 42 and a flap 43. The ring 42 has a circumferential wall in which an opening 421 is formed. A circumferential rib 422 is formed along an inside surface of the circumferential wall of the ring 42 to effect tight engagement between the ring 42 and the flap 43. The flap 43 has mounting sections 431 that are movably received in and retained by opposite ends of the opening 421 thereby forming a resistance-free check valve structure that allows for unidirectional flow of fluid there through.

A rack 20 comprises a bottom 21 and a top 22 between which at least one frame member 24 is connected. The buoy 12 of the air-blower mechanism 10 is movably fit over at least one of the frame members 24. The top 22 is provided with an accumulator 25 having an end in fluid communication with the pumping devices 11 and another end in fluid communication with the air conduit 13 to collect air pumped by the pumping devices 11 and conduct the air collected to the air conduit 13.

A power generation mechanism 30 comprises a constant-pressure and pressure-regulation device 31 and a power generator 32 having an air-driving turbine or windmill. The constant-pressure and pressure-regulation device 31 is connected to the extension tube 16 of the air-blower mechanism 10. The constant-pressure and pressure-regulation device 31 comprises a canister 33 and a weight block 34. The canister 33 has an air outlet 331 and an air inlet 332 and support blocks 333. The support blocks 333 are mounted on and extend from a bottom of the canister 33 to a height that is higher than the locations of the air outlet 331 and the air inlet 332. The air outlet 331 is provided with a flow control switch 337 for regulating airflow rate through the air outlet 331. The canister 33 is constructed with a metal layer 334, an epoxy resin layer 335, and a plastic sheet layer 336. The metal layer 334 serves as an inner lining, which is metal plate that is smooth, wear resistant, and corrosion resistant against sea water. Stainless steel is taken as an example of the metal plate that makes the metal layer 334 in the embodiment illustrated. An outer circumference of the metal layer 334 is surrounded by the epoxy resin layer 335 and is provided with reinforcing frames 338 to maintain the shape of the metal layer 334 of the canister 33. An outer circumference of the epoxy resin layer 335 is surrounded by the plastic sheet layer 336, which in the embodiment illustrated comprises a thin sheet of polycarbonate (PC). With the arrangement of the reinforcing frames 338 around the outer circumference of the metal layer 334 and filling the epoxy resin between the metal layer 334 and the plastic sheet layer 336 to form a sandwich structure, requirements of being light-weight, pressure-resistant, and of low friction coefficient can be met. An inside surface of the metal layer 334 is movably fit over and engages a seal head 35. The weight block 34 is mounted on the seal head 35. The canister 33 is maintained stationary, while the seal head 35 and the weight block 34 are movable up and down with the increase and decrease of the amount of air stored inside the canister 33. The seal head 35 is made of aluminum casting and is provided with sealing rings 36 to eliminate air leakage. The seal head 35 is further provided with wear-resistant guide projections 37 on upper and lower sides of the sealing rings 36 to guide stable up-and-down movement of the weight block 34 and the seal head 35 inside the canister 33. When substantially no air is preserved inside the constant-pressure and pressure-regulation device 31, the weight block 34 and the seal head 35 rest on the support blocks 333 inside the canister 33.

Referring to FIGS. 1-5, in a practical application, the air-blower tidal power generation device is positioned in sea tides. The bottom 21 of the rack 20 can be further added with an anchoring base 211, depending upon the situation of the sea where the device is mounted. In mounting the device, a bottom side of the buoy 12 is positioned as close as possible to the sea surface so that the buoy 12 can move up and down with the tides and thus drives the cylinders 14 of the pumping devices 11 to draw air into the cylinders 14 and forces air into the accumulator 25 arranged on the top 22 of the rack 20. The check valve 40 that is located inside the air conduit 13 is closed and prevents air to flow out of the opening 17 of the air conduit 13, while the check valve 41 located inside the extension tub 16 is open to allow the air to move along the extension tube 16 into the constant-pressure and pressure-regulation device 31. When air is filled into the constant-pressure and pressure-regulation device 31, the increased air pressure inside the constant-pressure and the pressure-regulation device 31 closes the check valve 41 inside the extension tube 16 thereby securing the air inside the constant-pressure and pressure-regulation device 31. When tides go down, the cylinder 14 of the pumping device 11 is lowered downward by gravity. The internal pressure is reduced, and the check valve 40 inside the air conduit 13 is open to draw air into the air conduit 13. Again, when tides go up, the cylinder 14 is pushed upward and air inside the air conduit 13 is compressed again, which closes the check valve 40 again. The opening/closing of the other check valve 41 is exactly opposite to that of the check valve 40 so that air can be repeatedly drawn into the air conduit 13 (through the check valve 40) and pumped to the constant-pressure and pressure-regulation device 31 (through the check valve 41). The air filled into and preserved in the constant-pressure and pressure-regulation device 31 is maintained at a constant pressure due to the fact that the weight block 34 provides a fixed gravitational force that is counteracted and thus balanced with the air pressure inside the canister 33. Thus, airflow that is induced under the constant pressure can be stably supplied from the constant-pressure and pressure-regulation device 31 to drive the power generator 32. Thus, in accordance with the present invention, the tides (and gravity) moves the buoy 12 of the air-bower mechanism 10 to cause the cylinder 14 to cyclically draw and pump air and the compressed air is preserved in the constant-pressure and pressure-regulation device 31 for continuous and stable supply of airflow to the turbine of the power generator 32 for generation of power.

Figure 5:
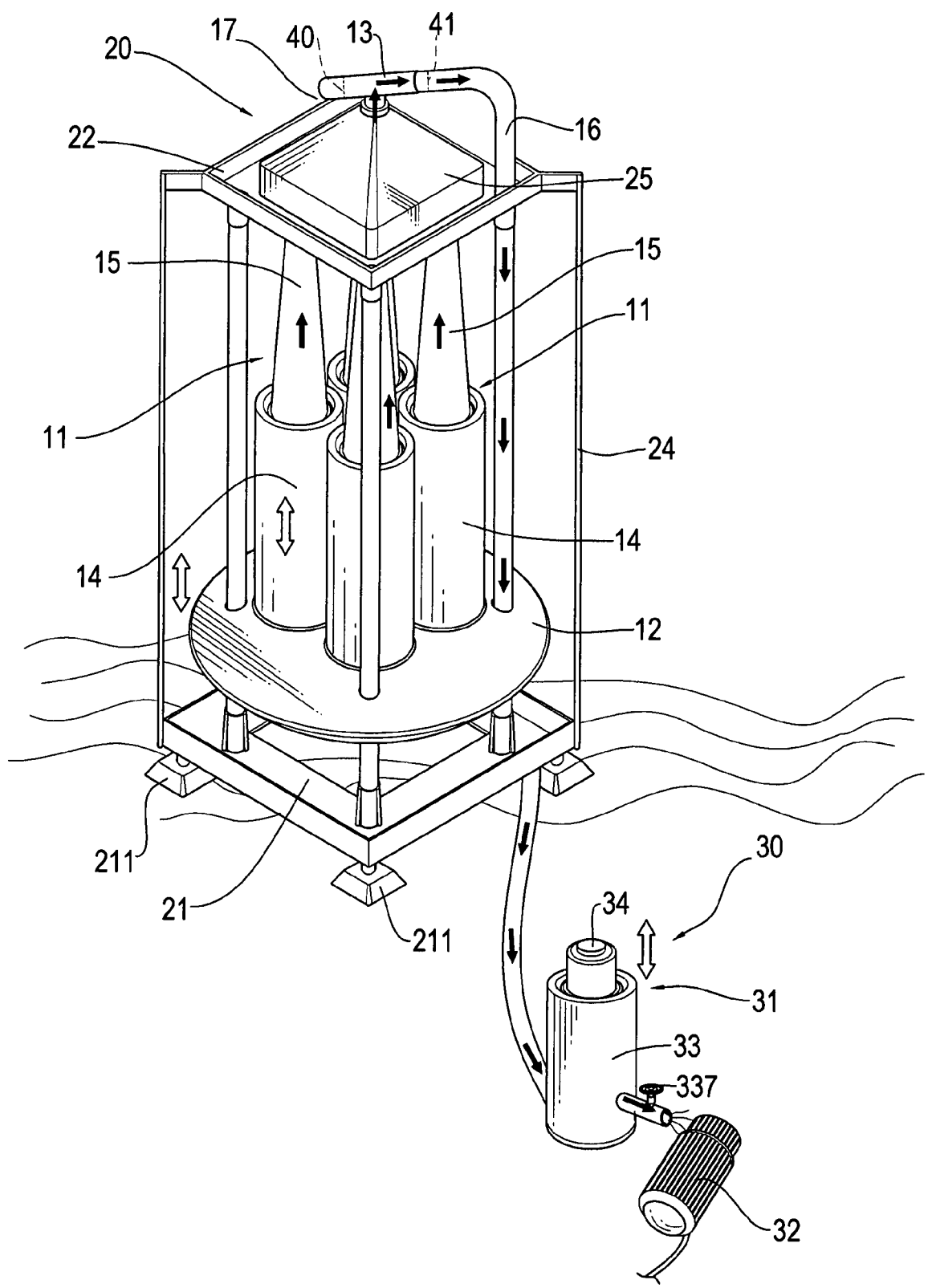
FIG. 5 is a perspective view illustrating an application of the air-blower tidal power generation device of the present invention.
Figure 6:
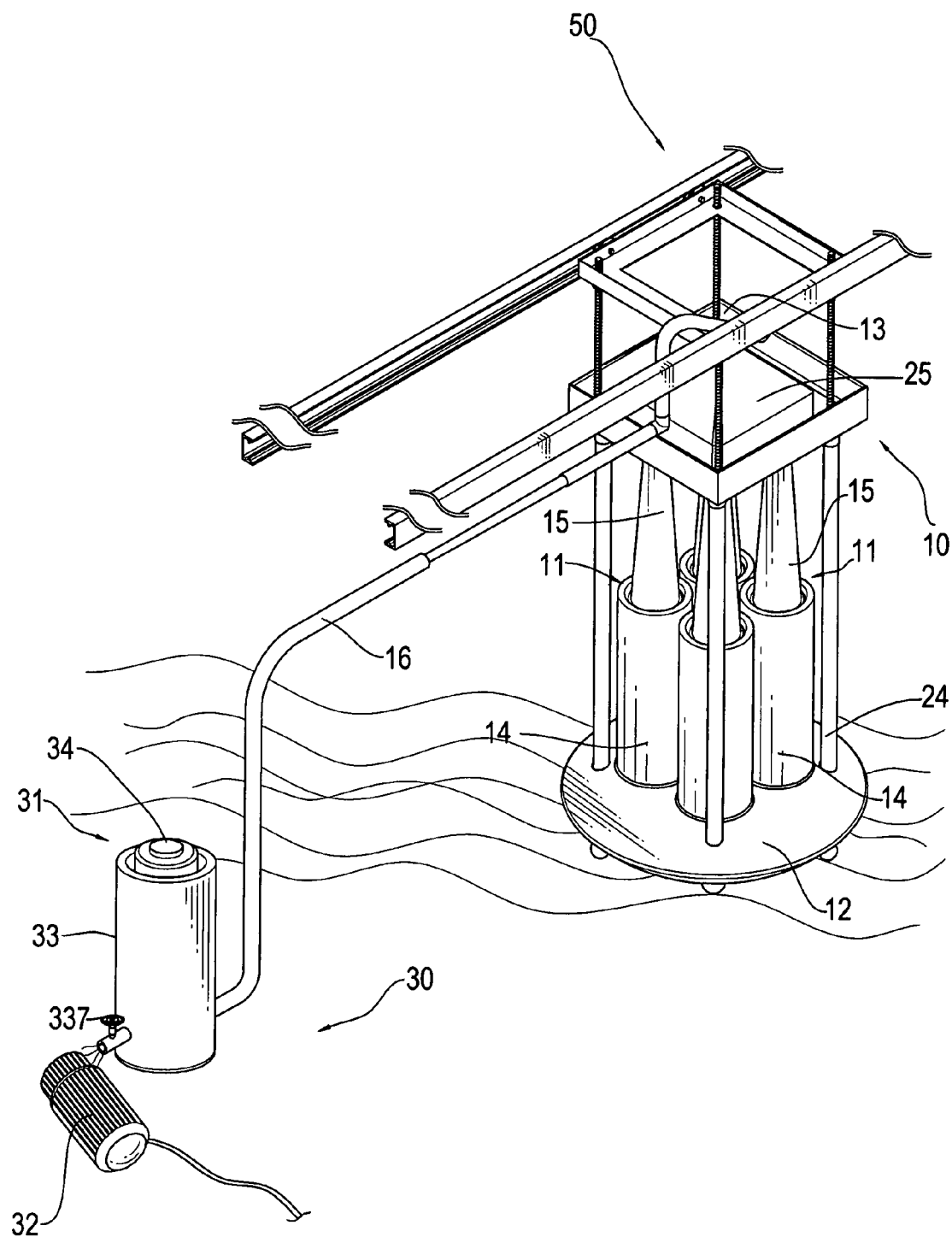
FIG. 6 is a perspective view of an air-blower tidal power generation device constructed in accordance with another embodiment of the present invention.

Referring to FIGS. 1-6, a second embodiment of the present invention is shown, wherein a movable rack 50 is provided to carry the system of the present invention to any desired location where the situation of tides is suitable. Thus, the present invention can be selectively installed at any environment or directly mounted in the sea, as shown in FIG. 5, or alternatively, the system of the present invention can be installed in a vessel or ship to be transported to any suitable location in oceans and seas to extract tidal energy and in case of bad weather, the whole system can be moved back to a home harbor with the ship.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An air-blower tidal power generation device, comprising:
    an air-blower mechanism comprising at least one pumping device, a buoy, and an air conduit, the pumping device comprising a cylinder and a stationary barrel, the cylinder comprising a metal layer, an epoxy resin layer, and a plastic sheet layer, the metal layer being an inner lining and having an outer circumference surrounded by the epoxy resin layer, the epoxy resin layer having an outer circumference surrounded by the plastic sheet layer, the metal layer having an inside surface movably fit over and engaging the stationary barrel, the cylinder located at one end of the pumping device and fixed to the buoy, the stationary barrel located at an opposite end of the pumping device and being in fluid communication with the air conduit, the air conduit being connected to and in fluid communication with an extension tube, the air conduit having an end forming an opening inside which a first check valve is mounted, a second check valve being arranged in the extension tube;
    a rack that carries the air-blower mechanism therein; and
    a power generation mechanism comprising a constant-pressure and pressure-regulation device and a power generator having an air-driven turbine, the constant-pressure and pressure-regulation device being connected to and in fluid communication with the extension tube;
    wherein the buoy is adapted to move up and down by tides to drive the pumping device for cyclically drawing and pumping air, the air being preserved in the constant-pressure and pressure-regulation device to provide a constant pressure for subsequent and stable supply of airflow to the turbine for driving the power generator to generate power.

2. The air-blower tidal power generation device as claimed in claim 1, wherein the rack comprises a bottom and a top and at least one frame member extending between the top and the bottom, the buoy being movably fit over at least one of the frame member.

3. The air-blower tidal power generation device as claimed in claim 2, wherein the bottom is further provided with an anchoring base.

4. The air-blower tidal power generation device as claimed in claim 2, wherein the top is provided with an accumulator having an end connected to the stationary barrel of the pumping device and another end connected to and in fluid communication with the air conduit to collect air pumped by the pumping device and guide the air into the air conduit.

5. The air-blower tidal power generation device as claimed in claim 1, wherein the metal layer of the cylinder is made of stainless steel.

6. The air-blower tidal power generation device as claimed in claim 1 further comprising a retention frame formed around the metal layer of the cylinder to retain shape of the metal layer.

7. The air-blower tidal power generation device as claimed in claim 1, wherein the check valves comprise a ring and a flap, the ring having a circumferential wall in which an opening is formed, the flap having mounting sections movably received in and retained by ends of the opening to allow air to flow in a single direction.

8. The air-blower tidal power generation device as claimed in claim 7, wherein the circumferential wall has an inside surface along which a circumferential rib is formed to tight engagement with the flap.

9. The air-blower tidal power generation device as claimed in claim 1 further comprising a seal head arranged between the metal layer of the cylinder and the stationary barrel, the seal head having sealing rings to eliminate air leakage.

10. The air-blower tidal power generation device as claimed in claim 9, wherein the seal head further comprises guide projections located at upper and lower sides of the sealing rings.

11. The air-blower tidal power generation device as claimed in claim 1, wherein the constant-pressure and pressure-regulation device comprises a canister and a weight block, the canister comprising a metal layer, an epoxy resin layer, and a plastic sheet layer, the metal layer serving as an inner lining, the epoxy resin layer surrounding an outer circumference of the metal layer, the plastic sheet layer surrounding an outer circumference of the epoxy resin layer, the weight block being movably received in the canister, the canister forming an air inlet and an air outlet.

12. The air-blower tidal power generation device as claimed in claim 11, wherein the weight block comprises a metal block.

13. The air-blower tidal power generation device as claimed in claim 11, wherein the metal layer of canister has an inner surface movably fit over and engaging a seal head, the weight block being mounted to the seal head, the seal head being provided with sealing rings to eliminate air leakage.

14. The air-blower tidal power generation device as claimed in claim 11, wherein the canister comprises support blocks.

15. The air-blower tidal power generation device as claimed in claim 14, wherein the support blocks mounted on a bottom of the canister and extending there from to a position higher than the air inlet and the air outlet.

16. The air-blower tidal power generation device as claimed in claim 11, wherein the air outlet of the canister is provided with a flow control switch.

17. The air-blower tidal power generation device as claimed in claim 11, wherein the canister comprises a reinforcing frame formed around the metal layer of the canister to retain shape of the metal layer of the canister.

18. The air-blower tidal power generation device as claimed in claim 13, wherein the seal head of the canister comprises abrasion-resistant guide projections arranged on upper and lower sides of the sealing rings thereof.

* * * * *